United States Patent [19]

Mashinsky et al.

[11] Patent Number: 5,217,653
[45] Date of Patent: Jun. 8, 1993

[54] METHOD AND APPARATUS FOR PRODUCING A STEPLESS 3-DIMENSIONAL OBJECT BY STEREOLITHOGRAPHY

[76] Inventors: Leonid Mashinsky, 46/B Bitsaron, Tel-Aviv 67894; Jackov Tuchinsky, 35/8 Nachmani St., Tel-Aviv 65795, both of Israel; Gleb A. Abakumov, Gorkogo 152a-57, Nishry Novgorod, 603006, U.S.S.R.; Valery A. Zaitsev, Yubileiny prospect 6-101, Reutov, Moscow obl. 143952, U.S.S.R.; Vladimir A. Murayev, Osharskaya 94-64, Nishny Novgorod, 603105, U.S.S.R.; Sergey L. Novoshilov, 3-Microrayon 19-118, Dmitrov, Moscow obl. 141800, U.S.S.R.; Vladimir D. Tihonov, Donetskaya 4-110, Nishny Novgorod, 603093, U.S.S.R.; Vladimir K. Cherkasov, Lenina 21-14, Nishny Novgorod, 603140, U.S.S.R.; Sergei A. Chesnokov, Gaidara 28-30, Dzershinsk, Nishegorodskaya obl., 606026, U.S.S.R.; Vadim N. Dzegilenok, Isacovskogo 33-2-250, Moscow, 123631, U.S.S.R.

[21] Appl. No.: 834,699

[22] Filed: Feb. 13, 1992

[30] Foreign Application Priority Data

Feb. 18, 1991 [SU] U.S.S.R. ............... 4912397

[51] Int. Cl.⁵ ............... B05D 3/06; B29C 35/08
[52] U.S. Cl. ............... 264/22; 264/40.1; 425/174.4; 219/121.25; 219/121.28
[58] Field of Search .......... 264/22, 40.1, 25, 308; 425/174, 174.4; 219/121.25, 121.28, 121.29, 121.79, 121.8; 156/273.3, 273.5, 275.5

[56] References Cited

U.S. PATENT DOCUMENTS

| 4,575,330 | 3/1986 | Hull |
| 4,801,477 | 1/1989 | Fudim |
| 5,014,207 | 5/1991 | Lawton ............... 219/121.73 |
| 5,093,552 | 3/1992 | Torii et al. ............... 219/121.83 |

OTHER PUBLICATIONS

"Automatic Method for Fabricating a Three-Dimensional Plastic Model with Photo-Hardening Polymer" by H. Kodama, Am. Institute of Physics, No. 11, 1981, pp. 1770–1773.

"Solid Object Generation" by A. J. Herbert, Journal of Applied Photographic Engineering, vol. 8, No. 4, 1982.

*Primary Examiner*—Jill L. Heitbrink
*Attorney, Agent, or Firm*—Helfgott & Karas

[57] ABSTRACT

A method and apparatus for producing a stepless 3-dimensional object by stereolithography, wherein a mathematical representation of the object is stored and dissected so as to generate a mathematical representation of a first laminate thereof, and a representative slope of the side wall surface of the first laminate at a plurality of different coordinates along the side wall surface is determined. The height of the first laminate is optimized by increasing the height whilst minimizing any deviation between the representative slope and the mathematical representation of the side wall surface. The liquid medium is irradiated with a beam of radiation at an angle representative of the uniform slope, and the irradiated liquid medium is allowed to polymerize and harden. The cured laminate is displaced relative to a surface of the liquid, and the process is repeated as required in respect of subsequent contiguous laminates. The apparatus includes a carriage having four degrees of freedom of movement for directing an optical fiber towards the liquid medium at a predetermined angle equal to the representative slope of the side wall.

16 Claims, 5 Drawing Sheets

METHOD AND APPARATUS FOR PRODUCING A STEPLESS 3-DIMENSIONAL OBJECT BY STEREOLITHOGRAPHY

FIELD OF THE INVENTION

This invention relates to a method and system for producing a 3-dimensional object using stereolithography.

BACKGROUND OF THE INVENTION

It is known to produce 3-dimensional objects having a complex shape using stereolithography, whereby the object is dissected into a plurality of contiguous laminates which are sequentially formed from a liquid medium which is polymerized upon being irradiated by a suitable source of illumination.

Thus, U.S. Pat. No. 4,575,330 (Hull) discloses a system for producing a three-dimensional object from a fluid medium capable of solidification when subjected to prescribed synergistic stimulation. The system creates a cross-sectional pattern of the object to be formed at a selected surface of a fluid medium which is capable of altering its physical state in response to appropriate synergistic stimulation by impinging radiation, particle bombardment or chemical reaction. Successive adjacent laminae, representing successive adjacent cross-sections of the object, are automatically formed and integrated together to provide a step-wise laminar buildup of the desired object.

Similarly, U.S. Pat. No. 4,801,477 (Fudim) describes a system for preparing three dimensional objects by irradiating uncured photopolymer by emitting radiation directly into desired areas within a quantity of the uncured photopolymer.

A radiation emitting surface within a quantity of uncured photopolymer is placed in contact with the area of the photopolymer to be irradiated, and radiation is then emitted to solidify the photopolymer to the desired extent. The radiation emitting surface may be coated with fluorinated ethylene propylene or ultra high molecular weight polyolefin. The positioning and irradiation steps can be repeated a desired number of times.

In known methods for forming 3-dimensional objects using stereolithography, a geometrical representation of the model is first produced and stored in a computer. Thereafter, the geometrical model is analyzed in order to produce laminates each having a uniform height and bound by upper and lower bases having equal dimensions. The side wall surface of each laminate is therefore perpendicular to the bases.

In such systems the heights of successive laminates are different, it clearly being desirable to maximize the height of each laminate in order to accelerate production of the complex shape, commensurate with preserving both the uniformity and the continuity of the object's external side wall surface.

In such an arrangement, the upper and lower bases of contiguous laminates are of different dimensions such that progressing from one laminate to the next results in a discontinuity in the curvature of the side wall surface of the object since, in effect, this is formed of a plurality of different sized plates formed contiguous with one another. Such discontinuities manifest themselves as "steps" in the side wall surface of the object and can be minimized by decreasing the height of each laminate. However, this increases the processing and manufacturing time, and hence the cost of the object. Furthermore, even by reducing the height of successive laminates, the step-wise side wall surface can never be completely cured of surface discontinuities.

Variations in the location of the radiation source with respect to the liquid medium being polymerized have been suggested in the art. Thus, for example, in above-mentioned U.S. Pat. No. 4,575,330 the liquid medium is illuminated from above whilst in U.S. Pat. No. 4,801,477 the illumination source is disposed within the liquid medium itself. U.S. Pat. No. 4,575,330 suggests an alternative embodiment wherein the liquid medium is contained within a transparent vessel which is illuminated through its base.

A. J. Herbert in "Solid Object Generation" appearing in the Journal of Applied Photographic Engineering, Vol. 8 No. 4, 1982, pp. 185–188 proposes a system employing a focused scanning laser beam whilst H. Kodama in "Automatic Method For Fabricating a 3-Dimensional Plastic Model With Photo-Hardening Polymer" appearing in Rev. Sci. Instrumentation Vol. 52 No. 11, 1981, pp 1770–1773 teaches the use of a space-modulated parallel light flux, the liquid medium being irradiated in both cases in accordance with the type of illumination.

Likewise, the location of the illumination source relative to the liquid medium is also influenced by the manner in which successive laminates are produced. In all cases, each successive laminate must be contiguous with the preceding laminate. However, this can be accomplished in one of two ways. According to one method, an upper surface of the liquid medium is illuminated and the resulting laminate is then lowered by a depth corresponding to the height of the next laminate, which is likewise polymerized, and so on. Alternatively, the solid object can be polymerized from beneath, so to speak, the object being withdrawn from the liquid medium as each successive laminate is polymerized.

In all cases, a geometrical or mathematical representation of the object is produced and stored in a CAD system. Successive laminates are then determined having optimized heights and bases of known contour, whereupon the laminates are formed by illuminating the liquid medium in a direction normal to a surface thereof.

As explained above, the side wall surface of each laminate is parallel to the direction of illumination, thereby producing a step-wise discontinuity in the external side wall surface of the object.

SUMMARY OF THE INVENTION

It is an object of the invention to provide a method and system for producing a stepless 3-dimensional objection by stereolithography, in which the drawbacks associated with hitherto proposed methods and systems are substantially reduced, or eliminated.

According to the invention there is provided a method for producing a stepless 3-dimensional object formed of a plurality of contiguous laminates each having a respective height and side wall surface and produced by stereolithographically polymerizing a liquid medium, said method comprising the steps of:

(a) storing a mathematical representation of said object, (b) dissecting the mathematical representation so as to generate a mathematical representation of a first laminate thereof having an upper and lower base bound by an interconnecting side wall surface formed by a generatrix having a predetermined angle to said base for each point along a periphery of said base, (c) determining a representative slope of the side wall surface of the first laminate for each of said points, (d) optimizing the height of said first laminate by increasing the height whilst minimizing any deviation between the representative slope determined in (c) and the mathematical representation of the side wall surface, (e) irradiating said liquid medium with a beam of radiation at an angle equal to said representative slope, (f) allowing the irradiated liquid medium to polymerize and harden, (g) displacing the first laminate relative to a surface of the liquid, and (h) repeating steps (b) to (g) as required in respect of subsequent contiguous laminates.

A system for producing a stepless 3-dimensional object in accordance with the invention comprises:

storage means for storing therein a geometrical model of said 3-dimensional object, a vessel for storing therein said liquid medium, a source of radiation for producing a beam of radiation, laminate generating means coupled to the storage means for generating said laminate each having upper and lower bases bound by an interconnecting side wall surface formed by a generatrix having a predetermined angle to said bases for each point along a periphery of said bases, directing means coupled to the laminate generating means for directing said beam of radiation towards said vessel so as to strike the liquid medium at said predetermined angle for each of said points, supporting means for supporting said object, and displacing means for displacing the object relative to the vessel so that a lowermost surface of the object is contiguous with each successively irradiated laminate.

Preferably, the source of radiation comprises a laser beam which is directed via an optical fiber so as to strike the liquid medium at the required angle and a source of parallel space-modulated illumination for illuminating large areas of the liquid medium simultaneously.

Furthermore, according to a preferred embodiment of the invention, a predetermined volume of liquid medium is poured into the vessel so as to have a height exactly equal to the height of the next laminate to be polymerized. The incomplete object comprising all the contiguous laminates so far polymerized is supported above the vessel so that the last-formed laminate has a lower surface in contact with the upper surface of the liquid medium. Light is then directed upwardly through a transparent base of the vessel, as required, in order to photopolymerize the complete depth of the liquid medium where necessary. This having been done, the object is raised by an amount equal to the height of the next laminate to be polymerized and a respective quantity of fresh liquid medium is poured into the vessel.

For uniformly sloped side wall surfaces, the laser beam is directed towards the liquid medium at an angle corresponding exactly to the slope of the side wall surface of the laminate at each point along a periphery thereof. For curved side wall surfaces, the laser beam is directed towards the liquid medium at an angle corresponding to an average slope of the side wall surface of the laminate at each point along a periphery thereof. In the former case, the resulting deviation between the side wall surface in the resulting object and that in the geometrical model is zero. In the latter case, the deviation is not zero but is still very much smaller than that obtained in hitherto proposed methods and systems.

In accordance with a further embodiment, only the side wall surfaces of each laminate are polymerized so that the resulting object comprises a succession of contiguous ring-type elements having negligible mass. The object is strengthened by means of stiffening ribs made in the form of partitions located in its hollow cavity either parallel or perpendicular to the laminate bases. Both stiffening ribs parallel to the laminate bases as well as contiguous laminates themselves may be formed by irradiating the liquid medium by a space-modulated parallel light flux, whereby a large surface of the liquid medium can be photopolymerized simultaneously. By this means, the production line for manufacturing each laminate may be significantly reduced.

BRIEF DESCRIPTION OF THE DRAWINGS

In order to understand the invention and to see how the same may be carried out in practice, a preferred embodiment will now be described, by way of non-limiting example only, with reference to the accompanying drawings, in which:

FIG. 9 is a schematic representation of a system according to the invention;

DETAILED DESCRIPTION OF A PREFERRED EMBODIMENT

Figure 1:
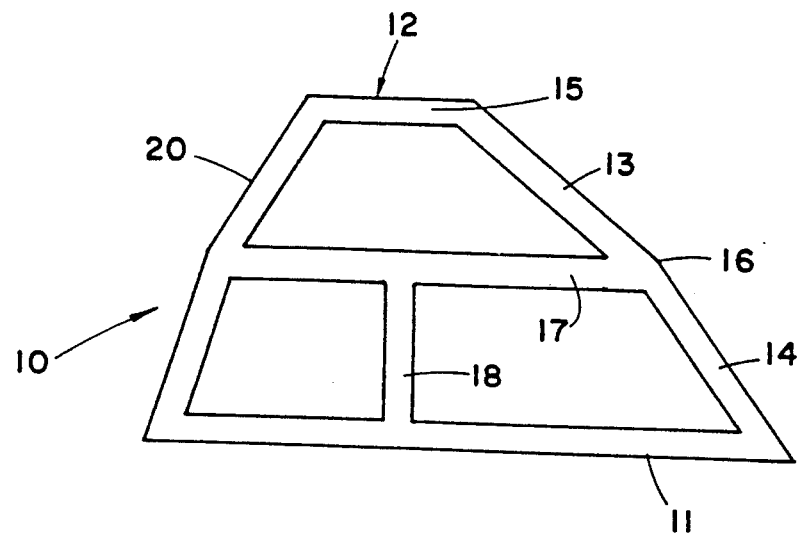
FIG. 1 shows a cross-section of a 3-dimensional object to be produced in accordance with the invention.
Figure 2:
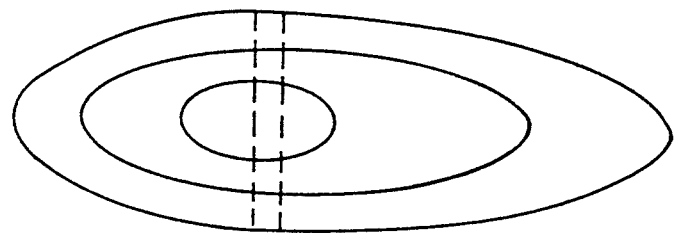
FIG. 2 shows a plan view of the object illustrated in FIG. 1.

Referring to FIGS. 1 and 2 there is shown in cross-section and plan view, respectively, a stepless 3-dimensional object depicted generally as 10 having an oval shaped base 11 and a domed top portion 12. The object 10 is formed from two contiguous parallel laminates 13 and 14 by photo-polymerizing a suitable liquid medium using stereo-lithography.

The uppermost laminate 13 comprises an upper base 15 and a lower base 16 which constitutes an upper base for the lowermost laminate 14. The base 11 of the object 10 constitutes a lower base for the lowermost laminate 14. The laminates 13 and 14 are formed hollow so that, in effect, only their side wall portions are photopolymerized and the object 10 is rendered rigid by means of stiffening ribs 17 and 18 disposed within the resulting cavity of the object 10 parallel and perpendicular, respectively, to the base 11 thereof.

Each of the laminates 13 and 14 is bound by a lateral side wall surface 20 described by a linear generatrix inclined at respective, predetermined angles to the lower bases 16 and 11 of the laminates 13 and 14, respectively.

Figure 3:
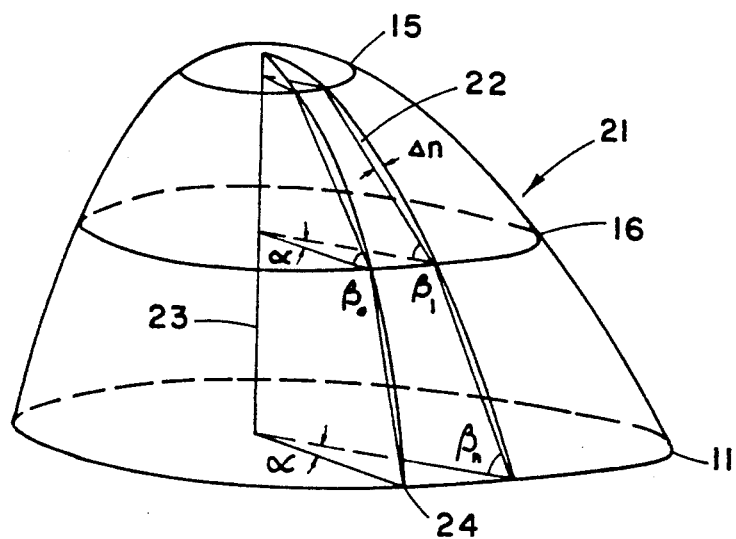
FIG. 3 shows pictorially a geometrical model of the object illustrated in FIG. 1.

FIG. 3 shows a geometrical model of the object 10 superimposed on a perspective view of the real-life object from which it is generated. Specifically, although the real-life object has curved side wall portions, the object 10 formed in accordance with the invention has straight side wall portions formed, generally, at an angle $\beta_n$ to the base thereof and suffering a maximum deviation $\Delta_n$ from the respective real-life side wall surface.

In a preferred embodiment of the invention, actually reduced to practice, the 3-dimensional object 10 was photopolymerized from a liquid medium comprising an oligo-ester acrylate containing a camphor quinone catalyst and the 3-dimensional object 10 was of overall length 80 mm, width 40 mm and height 20 mm.

The liquid medium was photopolymerized by laser light in the visible spectrum having an intensity of between 3 and 5 W/mm$^2$. When subjected to laser radiation of the aforementioned intensity, the liquid medium is capable of hardening up to a depth of 15 mm and this physical characteristic defines the maximum height of a laminate which can be formed by stereolithography. Specifically, the geometrical model 21 is dissected into successive contiguous laminates whose height is maximized commensurate with ensuring that the maximum deviation $\Delta_n$ never exceeds a predetermined threshold and, further, that the maximum height of the resulting laminate never exceeds the constraint of 15 mm.

In the particular example shown in FIG. 1, the heights of the two laminates 13 and 14 were both equal to 10 mm their respective base outlines 15, 16 and 11 coinciding exactly with those of the 3-dimensional object 10 formed by stereolithography. In other words, the upper and lower bases of each laminate of the model 10 coincide with those of the mathematical model 21 and are, of course, true replicas of the real-life model. Consequently, any deviation between the object 10 and the real-life model corresponds to those deviations $\Delta_n$ between the straight side wall portion of the 3-dimensional model 10 and the possibly curved side wall portion of the real-life model. Each laminate in the geometrical model 21 is formed by rotating a corresponding generatrix 22 around a vertical axis 23 passing through the center of the base 11 of the object 10 using the method of secant vertical half-plane rotation. The lateral side wall surface of each laminate 13 and 14 is described by the path thus formed by the corresponding generatrix 22 consequent to its rotation about the vertical axis 23 for each point on the corresponding peripheries of the respective upper and lower bases.

Associated with the lower base of each laminate is an origin such as that designated by 24 for the lower base 11 of the lowermost laminate 14. The locus of each point along the periphery of the lower base 11 is defined by the rotation of a line passing through the vertical axis 23 as through an angle $\alpha$ varying from 0° through 360°. Thus, when $\alpha = \alpha_n$, the inclination of the side wall portion to the lower base in each laminate is denoted by $\beta_n$.

Having thus generated the geometrical model 21 corresponding to the 3-dimensional object 10, the laminates 13 and 14 are successively produced by stereolithography in a manner which will now be described with reference to FIGS. 4 to 6 of the drawings.

Figure 4:
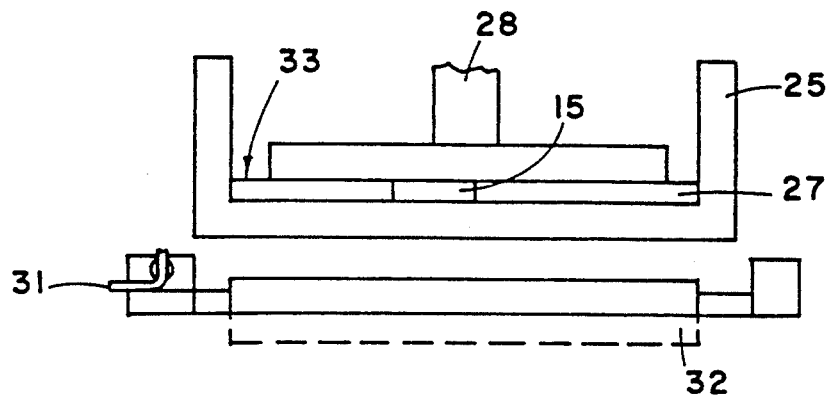
FIGS. 4 to 8 are schematic representations showing various stages of the object during manufacture.
Figure 5:
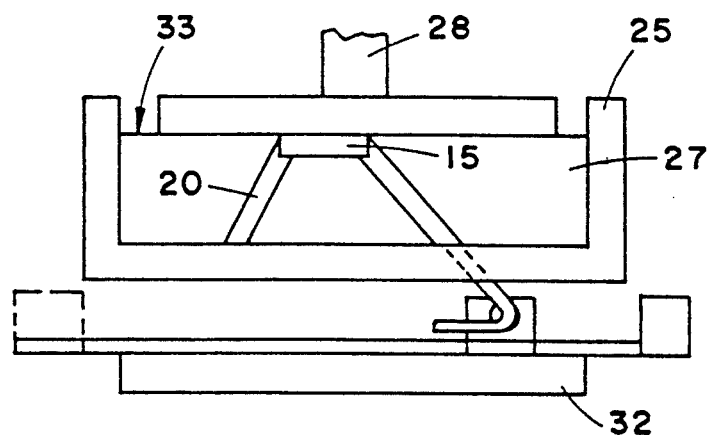
Figure 6:
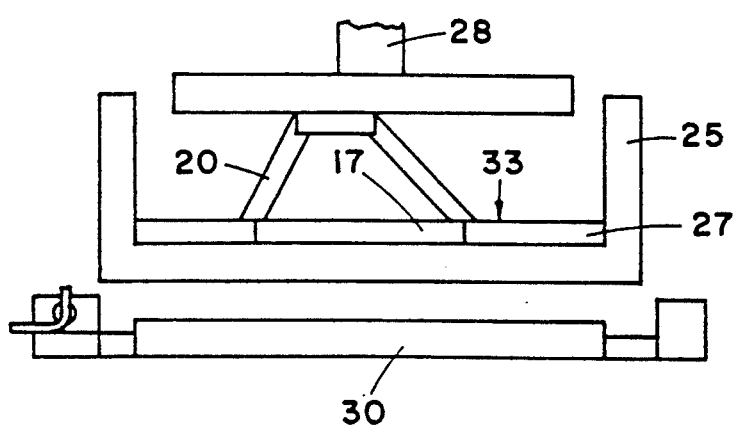

There is shown in FIGS. 4 to 6 a vessel 25 having a transparent lower surface for containing therein a liquid medium 27 susceptible to photopolymerization upon being irradiated with suitable light. Also shown schematically is a support clamp 28 for supporting thereunder the 3-dimensional object 10 as it is formed and being displaceable with respect to the vessel 25 in order to withdraw the 3-dimensional object 10 from the liquid medium 27. The 3-dimensional object 10 is supported by the support clamp 28 by means of wire elements (not shown) projecting downwardly from the lower surface of the support clamp 28 by a depth corresponding to the thickness of the upper base 15 of the uppermost laminate 13, whereupon the wire elements protrude through the upper base thereof so that when the upper base hardens, the 3-dimensional object 10 is held supported by the wire elements against the lower surface of the support clamp 28.

Provided underneath the vessel 25 is a light source depicted generally as 30 for producing a space-modulated parallel light flux and an optical fiber 31 (constituting a flexible waveguide means) for directing a beam of laser light through the transparent lower surface of the vessel 25 so as to strike the liquid medium 27 at a predetermined angle $\beta_n$ corresponding to the inclination of the generatrix 22 to the base of the laminate as shown in FIG. 3.

The light source 30 is typically provided by a xenon lamp which can be adapted to strike predetermined points within an area of the liquid medium 27 by means of a liquid crystal matrix. A drive 32 brings the light source 30 in close proximity to the lower surface of the vessel 25, thereby rendering the light source 30 operative. Likewise, when the light source 30 is withdrawn from the lower surface of the vessel 25, it ceases any longer to be operative and no light passes through the liquid medium 27.

A light flux having an intensity of between 30 and 50 kLx is used requiring continuous illumination for a time period of between 30–60 s in order for the liquid medium 27 to harden.

The lower inside surface of the vessel 25 and the lower surface of the support clamp 28 are covered with a suitable anti-adhesion layer such as gelatine (not shown) in order to prevent the photopolymerized liquid medium 27 from sticking thereto.

The method of manufacture in accordance with the invention is as follows. The support clamp 28 is withdrawn from the inside lower surface of the vessel 25 so that the distance between the inside lower surface of the vessel 25 and the lower surface of the support clamp 28 is equal to the height of the upper base 15 of the uppermost laminate 13. This having been done, a volume of the liquid medium 27 is poured into the vessel 25 so that its upper surface 33 is exactly flush with the lower surface of the support clamp 28. The light source 32 is then activated so that the complete area corresponding to the upper base 15 of the lowermost laminate 13 is simultaneously exposed to illumination, care being taken to prevent stray illumination from reaching other portions of the liquid medium 27. The illumination is maintained for the required time interval, whereupon the liquid medium 27 within a volume corresponding to the upper base 15 is photopolymerized and hardens. In contrast to this, the remainder of the liquid medium 27 outside of the upper base 15 is not illuminated and therefore remains liquid.

Having formed the upper base 15, the lateral side wall surface 20 of the uppermost laminate 13 is now formed. As shown in FIG. 5, the support clamp 28 is withdrawn further from the lower inside surface of the vessel 25 so that the lower inside surface of the vessel 25 is displaced from the lower surface of the support clamp 28 by a distance equal to the height $h_1$ of the uppermost laminate 13. The liquid medium 27 is then poured into the vessel 25 in sufficient quantity that its upper surface 33 lies flush with the lower surface of the support clamp 28, the now polymerized the upper base 15 being submerged within the liquid 27.

The source of illumination 32 is now rendered inoperative, the liquid medium 27 being illuminated by a laser beam via the optical fiber 31. In order to do this, a tip of the optical fiber 31 proximate the vessel 25 is brought to a reference point corresponding to the origin 24 on the periphery of the lower base 11 (see FIG. 3). The optical fiber 31 is then orientated towards the liquid medium 27 at an angle $\beta_0$ corresponding to the angle which the generatrix of the uppermost laminate 13 forms with the lower base 16 thereof at an origin point corresponding to the origin 24 of the lower base 11. On passing illumination via the optical fiber 31 through the liquid medium 27 at the required angle $\beta_0$, a thread within the liquid medium 27 is photopolymerized at exactly the required angle for the mathematically generated optimized laminate 13. The optical fiber 31 is then displaced through an angle $\alpha$ (see FIG. 3) and is inclined towards the liquid medium 27 at an angle $\beta_1$ corresponding to the inclination of the generatrix to the base at a point along the base 16 disposed an angle $\alpha$ from the origin point thereof. In practice, of course, the incremental angle $\alpha$ is extremely small and the complete cycle is repeated for each angular increment from $\alpha=0°$ through $\alpha=360°$.

It will be apparent that the dimensions of the thread which is photopolymerized within the liquid medium 27 is dependent on the thickness of the focused light beam emerging from the optical fiber 31. Thus the laser beam is focused to a thickness typically between 1 and 2 mm corresponding to the width of the lateral side wall portion 20 of the laminates. In practice, the angle $\alpha$ is varied continuously from 0° to 360°, the required adjustments being made continuously to the inclination of the optical fiber 31 to the liquid medium 27. By such means, the effective velocity of the laser beam may be maintained between 15-50 mm s$^{-1}$.

Having formed the side wall portion 20 of the uppermost laminate 13, the horizontal stiffening rib 17 is now formed.

FIG. 6 shows how this is accomplished in practice, the process being essentially identical to that described above. Thus, the support clamp 28 is raised such that the distance between the lower surface of the side wall portion 20 and the lower inside surface of the vessel 25 is equal to the height of the horizontal stiffening rib 17. A sufficient quantity of the liquid medium 27 is now drained or otherwise removed from the vessel 25 in order that the upper surface 33 of the remaining liquid medium 27 is flush with the lower surface of the side wall portion 20. The light source 30 is now brought into its operational position and parallel, space-modulated illumination is passed through the liquid medium 27 through a volume thereof within the confines of the stiffening rib 17. The illumination is maintained for the required time interval, whereupon the liquid medium 27 within the boundary of the horizontal stiffening rib 17 photopolymerizes and hardens. As before, any liquid medium outside the boundary of the horizontal stiffening rib 17 is not illuminated and therefore remains liquid.

The dimensions of the horizontal stiffening rib 17 are calculated in accordance with the geometrical model 21 (FIG. 3) such that the horizontal stiffening rib 17 adjoins the already formed side wall portion 21 of the uppermost laminate 13 and is therefore integrally bonded thereto.

Figure 7:
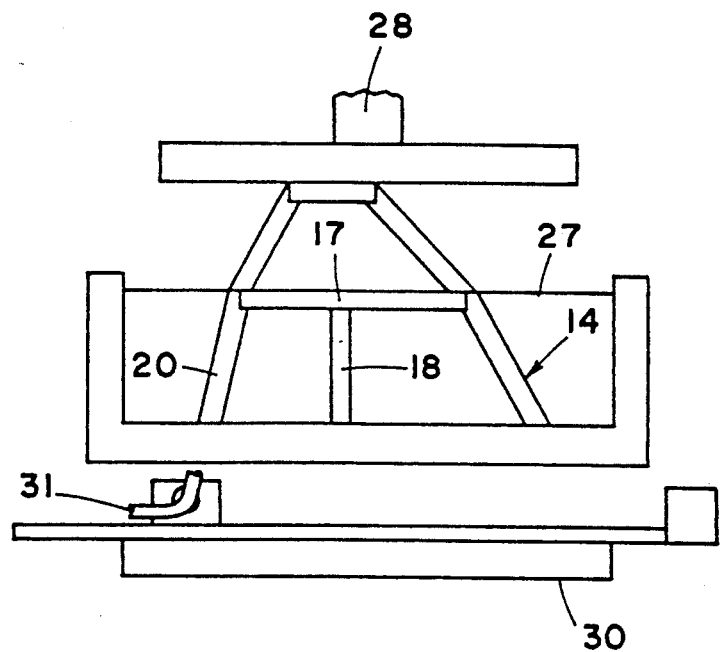

FIG. 7 shows the next stage in the manufacturing process wherein the side wall portion 20 of the lowermost laminate 14 is formed together with the vertical stiffening rib 18 shown in FIG. 1. Both of these components are formed at the same time by the simultaneous application of a parallel space-modulated light flux 30 within the volume of the liquid medium 27 confined by the vertical stiffening rib 18 and by suitable laser illumination applied through the optical fiber 31 at the required angle to the liquid medium 27 for each point along the base 11 as the angle $\alpha$ varies from 0° to 360°.

The manner in which this is accomplished is exactly as explained above with reference to FIGS. 4 to 6, the support clamp 28 being raised and a sufficient quantity of liquid medium 27 being added so that its depth corresponds exactly to the height of the lowermost laminate 14. Under these conditions, the horizontal stiffening rib 17 and that part of the side wall portion 20 bonded thereto lie submerged beneath the surface of the liquid medium 27.

Figure 8:
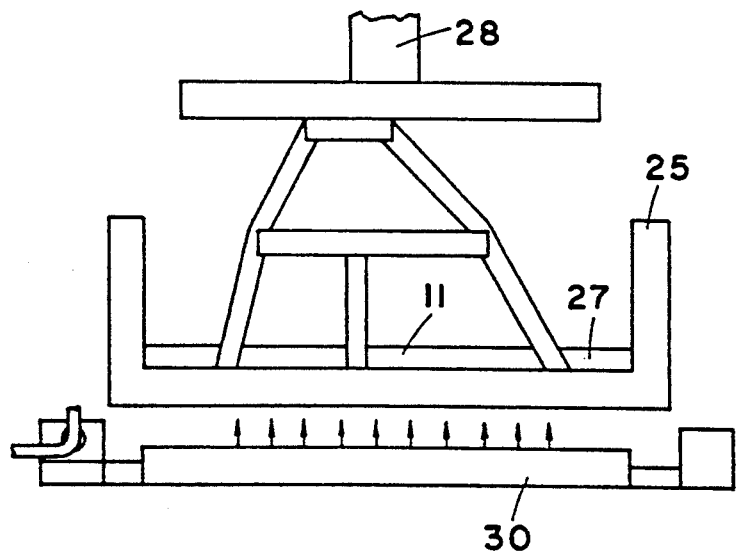

FIG. 8 shows the final stage of the manufacture wherein the lower base 11 of the lowermost laminate 14 is formed. During this stage of the process, the support clamp 28 is maintained in the same position as that shown in FIG. 7, such that the lowermost portion of the side wall surface 20 and of the vertical stiffening rib 18 abut the lower inside surface of the vessel 25. Liquid medium 27 is drained from the vessel 25 so that the depth of the liquid medium 27 remaining therein is equal to the height of the lower base 11 of the lowermost laminate 14.

The required area of the liquid medium 27 corresponding to the area bound by the lower base 11 is then illuminated by the parallel space-modulated light flux 30 in order to photopolymerize it. As before, care is taken to avoid illuminating any area of the liquid medium 27 outside the boundary of the lower base 11 in order that such liquid medium remains completely liquid.

Upon completion of the above-described process, the 3-dimensional object 10 is formed having a substantially hollow shell reinforced by the horizontal and vertical stiffening ribs 17 and 18, respectively. If required, further curing may be achieved by means of illumination or heat radiation so as to increase the hardness of the 3-dimensional object 10.

The above process may be carried out either in air, employing, for example, the ionic mechanism or, alternatively, completely submerged within an inert gas or vacuum employing, for example, a radical-operating mechanism.

Upon completion of its formation, the 3-dimensional object 10 is removed from the support clamp 28, either before or after post-hardening, as required, together with the wire elements embedded within the upper base 15 of the uppermost laminate 13. The ends of the wire elements retaining the upper base 15 are removed thereby permitting separation of the 3-dimensional object 10 from the support clamp 28.

It will be appreciated that, for the sake of simplicity, the above process has been described with respect to only two laminates 13 and 14 strengthened by only a single horizontal stiffening rib 17 and a single vertical stiffening rib 18. In practice, the geometrical model 21 is dissected into a plurality of laminates commensurate with the desire, on the one hand, to reduce the number of laminates and therefore the manufacturing time and, on the other hand, the desire to minimize the maximum deviation $\Delta$ between the side wall portion of the laminate and the actual surface of the real-life model.

Referring now to FIG. 9 there is shown schematically a system depicted generally as 35 for carrying out the method described in detail above with reference to FIGS. 1 to 8 of the drawings.

The system 35 comprises a CAD database 36 for storing therein a mathematical representation of the real-life model to be formed by stereolithography. Coupled to the CAD database 36 is an analyzer 37 for processing the CAD database 36 in order to dissect the geometrical model into laminates and to determine the required parameters associated with the laminates as well as with any horizontal and vertical stiffening ribs which may be required. The analyzer 37 also determines the required locus of the optical fiber 31 in order that the laser beam may be directed therethrough at the required angle for each point along the periphery of the base of the respective laminate.

A control unit 38 coupled to the analyzer 37 permits control of the manufacturing process to be carried out and, to this end, has outputs coupled to a liquid level control 39, a laser source 40, the source of parallel space-modulated light flux 30, a drive unit 41 for displacing the light source 30 and a direction control unit 42 for controlling the spatial movement of the beam produced by the laser 40 and passing through the optical fiber 31 coupled thereto.

The drive unit 41 is coupled to the light source 30 for displacing it relative to the base of the vessel 25 in order that it may penetrate the liquid medium 27 therein, and for withdrawing it from the base of the vessel 25, whereby the light source 30 is effectively inoperative. Likewise, a drive unit 43 (constituting a displacing means) is coupled to control unit 38 and to the support clamp 28 for effecting vertical displacement of the support clamp 28 relative to the vessel 25. The direction control unit 42 is coupled to a carriage 45 to which is fixed the optical fiber 31, so that suitable movement of the carriage 45 along two translational and two rotational axes, causes the laser light emanating from the optical fiber 31 to be directed towards the liquid medium 27 at the required angle.

Figure 10:
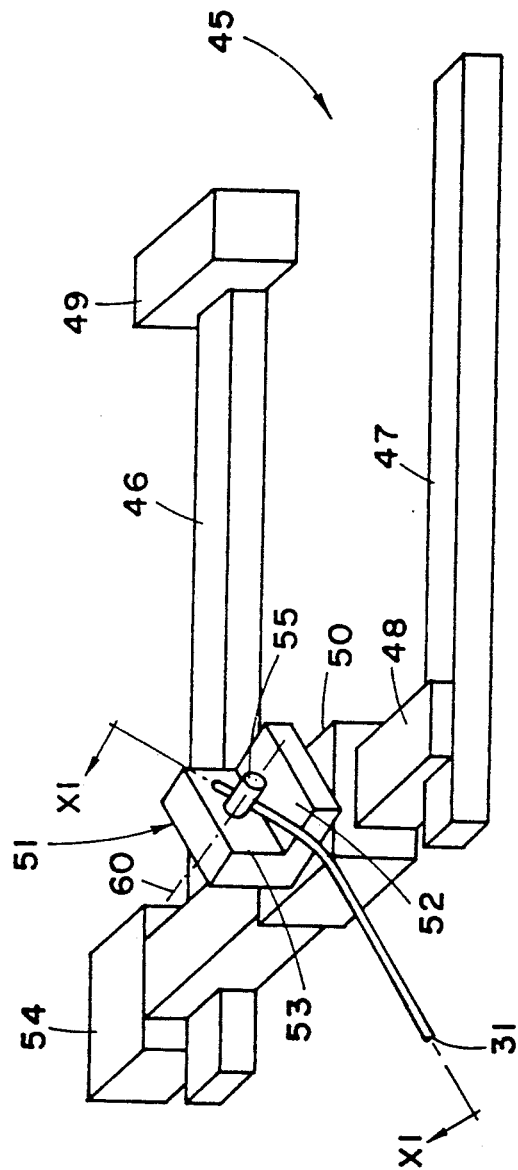
FIG. 10 is a pictorial representation of a carriage for directing a light beam to the liquid medium for use in the system shown in FIG. 9.

FIG. 10 shows a detail of the carriage 45 which comprises two parallel longitudinal guide rails 46 and 47 to which is slidably connected a transverse guide rail 48 driven by a drive means 49. Slidably connected to the transverse guide rail 48 is a U-shaped bracket 50 to which there is pivotally coupled an L-shaped bracket 51 about a horizontal section 52 thereof. The U-shaped bracket 50 is coupled to a drive means 54 in order that it may be moved along the transverse guide rail 48.

Rotatably coupled to an upright portion 53 of the L-shaped bracket 51 is a shaft 55 having an aperture therethrough for accommodating the optical fiber 31.

In addition to the drives 49 and 54 which effect independent translational movement of the transverse guide rail 48 and of the U-shaped bracket 50, two further independent drives (not shown) effect the rotational movements of the L-shaped bracket 51 and of the shaft 55.

Figure 11:
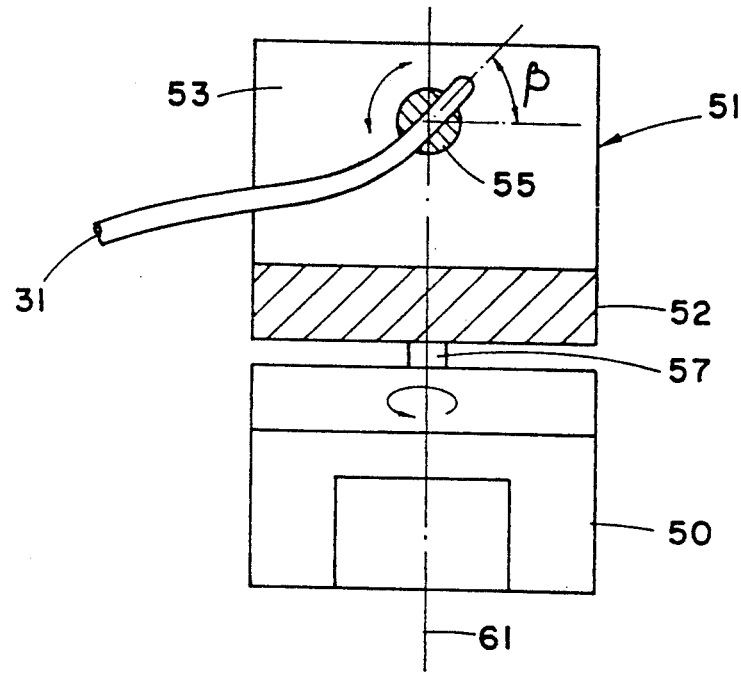
FIG. 11 is a cross-sectional view of the carriage shown in FIG. 10 along the line XI—XI.

FIG. 11 shows in cross-section a detail of the carriage 45 along the line XI—XI showing the free end of the optical fiber 31 secured within the shaft 55 at an angle $\beta$ to the horizontal, the base 52 of the L-shaped bracket 51 being rotatably coupled to the U-shaped bracket 50 by means of a pin 57. In practice, rotation of the L-shaped bracket 51 about the pin 57 permits continuous variation to be made to the angle $\alpha$ shown in FIG. 3 whilst rotation of the shaft 55 within the vertical section 53 of the L-shaped bracket 51 produces variation in the angle $\beta$.

The optical fiber 31 is secured to the shaft 55 so as to pass through a diametrically disposed aperture therein so that the free end of the optical fiber 31 passes through the point of intersection of the two axes of rotation 60 and 61. By this means the respective rotations about the axes 60 and 61 are effectively decoupled from the translatory movements along the longitudinal guide rails 46 and 47 and along the transverse guide rail 48 so that the carriage 45 has four degrees of freedom, thereby permitting precise directional alignment of the free end of the optical fiber 31 with the vessel 25.

It will be appreciated that the desired movement of the optical fiber 31 can also be accomplished by other means. Thus, for example, separate 2-dimensional translatory movement of the optical fiber 31 may be employed, the optical fiber 31 being secured to two parallel carriages spaced apart for independent movement in two mutually perpendicular directions within the parallel planes of the respective carriages. In such cases, the optical fiber 31 is hingedly mounted to the carriages and axial displacement of the optical fiber 31 with respect to one of the carriages must also be provided for.

It will further be appreciated that, whilst in the preferred embodiment two independent translatory and rotary movements of the optical fiber 31 are provided, these specific movements are not themselves essential. What is important is that the optical fiber 31 be susceptible to movement in four mutually independent directions and it will be apparent that such movement can be accomplished in a variety of ways well known in the art.

In order that the laser light emerging from the free end of the optical fiber 31 may pass through the liquid medium 27 contained within the vessel 25 without being subjected to refraction, it is preferable that the vessel 25 be formed, at least in its transparent lower section, of a material having the same refractive index as the liquid medium 27. Alternatively, allowance must be made for refraction of the beam entering the liquid medium 27 and the angle $\beta$ corresponding to the direction of the light beam emerging from the optical fiber 31 to the vessel 27 must be adjusted accordingly. Alternatively, the beam emerging from the optical fiber 31 may be arranged to penetrate the liquid medium 27 from within the vessel 25 (so as not to be refracted on entering the vessel 25) and, in this case, can be introduced into the liquid medium 27 via a radiation-inert medium having the same refractive index as the liquid medium 27.

Figures 12, 13:
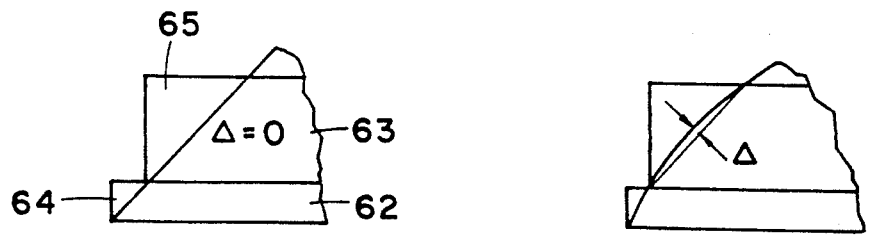
FIG. 12 shows a comparison of the agreement between a sloped side wall surface of the object and of the geometrical model when produced by prior art methods and the method according to the invention.
FIG. 13 is a comparison of the agreement between a curvilinear side wall surface of the object and of the geometrical model when produced by prior art methods and by the method according to the invention.

FIGS. 12 and 13 show, respectively, side-wall sections produced by prior art systems and by the invention for real-life models having uniform slopes and curved slopes, respectively.

Specifically, FIG. 12 shows a first laminate 62 adjoining a second laminate 63 both having, for the sake of illustration, identical slopes. The deviation Δ between the actual slope of the object produced by the invention and the theoretical slope of the geometrical model is zero. However, since in prior art systems the liquid medium is illuminated in a direction normal to the bases of the laminates 62 and 63, each of the laminates 62 and 63 has in cross-section a triangular step 64 and 65, respectively, which project from the theoretical side-wall surface by a distance which varies in direct proportion to the height of the laminate. Thus, in order to reduce the effect of the stepped portions 64 and 65, it is necessary to minimize the depth of each laminate 62 and 63, thereby adding significantly to the manufacturing time and hence cost. Even then, the side wall surface of the resulting side-wall portion is never completely smooth and requires polishing subsequent to manufacture.

In contrast to this, for uniformly sloped side-wall portions, the deviation Δ achieved with the invention is zero and consequently an exact fit is produced between the 3-dimension object produced by the invention and the geometrical model thereof.

In the case where the side-wall portion of the real-life model is not uniformly sloped, there will exist a small deviation Δ even with the invention since, according to the invention, each generatrix of the side-wall portion is approximated by a straight line segment. However, as will be seen from FIG. 13 the resulting deviation Δ is still very much less than the step errors associated with prior art methods and systems.

Thus, in accordance with the invention, there is provided an improved method and system for producing complex shaped 3-dimensional objects using stereolithography, wherein the deviation between the side-wall portions of the manufactured object and the corresponding side-wall portions of the real-life object (or its geometrical representation) is very substantially reduced over prior art methods and systems.

Furthermore, as a direct consequence of the novel method provided by the invention, laminates may be photopolymerized having a significantly greater depth than may be achieved using hitherto proposed methods, without compromising the accuracy of the side-wall portions so far as uniformly sloped sections thereof are concerned, and compromising only mimimally where the side-wall sections are non-uniformly curved.

As a result, more accurate models may be produced by the invention in significantly less time than that achieved with hitherto proposed systems and finishing processes such as polishing, and so on, are rendered unnecessary.

We claim:

1. A method for producing a stepless 3-dimensional object formed of a plurality of contiguous laminates each having a respective height and side wall surface and produced by stereolithographically polymerizing a liquid medium, said method comprising the steps of:
   (a) storing a mathematical representation of said object,
   (b) dissecting the mathematical representation so as to generate a mathematical representation of a first laminate thereof having an upper and lower base bound by an interconnecting side wall surface formed by a generatrix having a predetermined angle to said base for each point along a periphery of said base,
   (c) determining a representative slope of the side wall surface of the first laminate for each of said points,
   (d) optimizing the height of said first laminate by increasing the height whilst minimizing any deviation between the representative slope determined in (c) and the mathematical representation of the side wall surface,
   (e) irradiating said liquid medium with a beam of radiation at an angle equal to said representative slope,
   (f) allowing the irradiated liquid medium to polymerize and harden,
   (g) displacing the first laminate relative to a surface of the liquid, and
   (h) repeating steps (b) to (g) as required in respect of subsequent contiguous laminates.

2. The method according to claim 1, wherein at least one of said laminates is polymerized along its side wall surface only whereby said at least one laminate is rendered hollow thereby decreasing the resulting mass of said 3-dimensional object.

3. The method according to claim 2, further including the step of forming at least one reinforcing rib integral with said at least one laminate so as to render the 3-dimensional object more rigid.

4. The method according to claim 1, further including the step of irradiating the liquid medium normal to a base of each laminate with a flux of parallel space modulated radiation.

5. The method according to claim 1, wherein step (g) comprises:
   displacing the first laminate relative to a lower inside surface of a vessel containing therein a volume of said liquid medium so as to maintain a distance between said lower inside surface and a lower surface of the first laminate equal to the height of a successive laminate, and
   adjusting the volume of the liquid medium in said vessel such that an upper surface of the liquid medium is level with the lower surface of said first laminate.

6. An apparatus for producing a stepless 3-dimensional object formed of a plurality of contiguous laminates each having a respective height and side wall surface inclined in respect to a vertical and being produced by stereolithographically polymerizing a liquid medium, the system comprising:
   storage means for storing therein a geometrical model of said 3-dimensional object,
   a vessel for storing therein said liquid medium,
   a source of radiation for producing a beam of radiation,
   laminate generating means coupled to the storage means for generating laminates each having upper and lower bases bound by an interconnecting side wall surface inclined in respect to a vertical and being formed by a generatrix having a predetermined angle to said bases for each point along a periphery of said bases,
   directing means coupled to the laminate generating means for directing said beam of radiation towards said vessel so as to strike the liquid medium at said predetermined angle for each of said points,
   supporting means for supporting said object, and
   displacing means for displacing the object relative to the vessel so that a lowermost surface of the object is contiguous with each successively irradiated laminate.

7. The apparatus according to claim 6, wherein the directing means has four degrees of freedom.

8. The system according to claim 7, wherein the directing means comprises:
   a carriage,
   independent drive means coupled to the carriage for effective translational movement thereof in two mutually perpendicular directions in a predetermined plane,
   a platform mounted on the carriage and rotatable about a first axis perpendicular to said plane,
   a drive shaft mounted on the platform and rotatable about a second axis perpendicular to said first axis, and
   flexible waveguide means secured to said drive shaft for directing said beam of irradiation from a first end of the waveguide means proximate said source of irradiation to a second end of the waveguide means proximate said vessel.

9. The apparatus according to claim 8, wherein said beam of irradiation is visible light and said waveguide means is an optical fiber.

10. The apparatus according to claim 6, further including a subsidiary source of radiation for producing space-modulated parallel irradiation which is directed normal to a lower surface of the vessel within the periphery of said lower base.

11. The apparatus according to claim 6, wherein the liquid medium has a depth equal to a height of said laminate between the lower and upper bases thereof, said lowermost surface of the object being contiguous with an upper surface of the liquid medium.

12. An apparatus for producing a stepless 3-dimensional object formed of a plurality of contiguous laminates each having a respective height and side wall surface and produced by stereolithographically polymerizing a liquid medium, the system comprising:
   storage means for storing therein a geometrical model of said 3-dimensional object,
   a vessel for storing therein said liquid medium,
   a source of radiation for producing a beam of radiation,
   laminate generating means coupled to the storage means for generating said laminates each having upper and lower bases bound by an interconnecting side wall surface formed by a generatrix having a predetermined angle to said bases for each point along a periphery of said bases,
   directing means coupled to the laminate generating means for directing said beam of radiation towards said vessel so as to strike the liquid medium at said predetermined angle for each of said points,
   supporting means for supporting said object, and
   displacing means for displacing the object relative to the vessel so that a lowermost surface of the object is contiguous with each successively irradiated laminate, wherein the directing means has four degrees of freedom.

13. The apparatus according to claim 12, wherein the directing means comprises:
   a carriage,
   independent drive means coupled to the carriage for effective translational movement thereof in two mutually perpendicular directions in a predetermined plane,
   a platform mounted on the carriage and rotatable about a first axis perpendicular to said plane,
   a drive shaft mounted on the platform and rotatable about a second axis perpendicular to said first axis, and
   flexible waveguide means secured to said drive shaft for directing said beam of irradiation from a first end of the waveguide means proximate said source of irradiation to a second end of the waveguide means proximate said vessel.

14. The apparatus according to claim 13, wherein said beam of irradiation is visible light and said waveguide means is an optical fiber.

15. The apparatus according to claim 12, further including a subsidiary source of radiation for producing space-modulated parallel irradiation which is directed normal to a lower surface of the vessel within the periphery of said lower base.

16. The apparatus according to claim 12, wherein the liquid medium has a depth equal to a height of said laminate between the lower and upper bases thereof, said lowermost surface of the object being contiguous with an upper surface of the liquid medium.

* * * * *